March 2, 1965 W. G. OWNBY 3,171,486
MAGNETICALLY ACTUATED WELL TOOL AND COOPERATING TUBING NIPPLE
Filed April 19, 1961 5 Sheets-Sheet 1
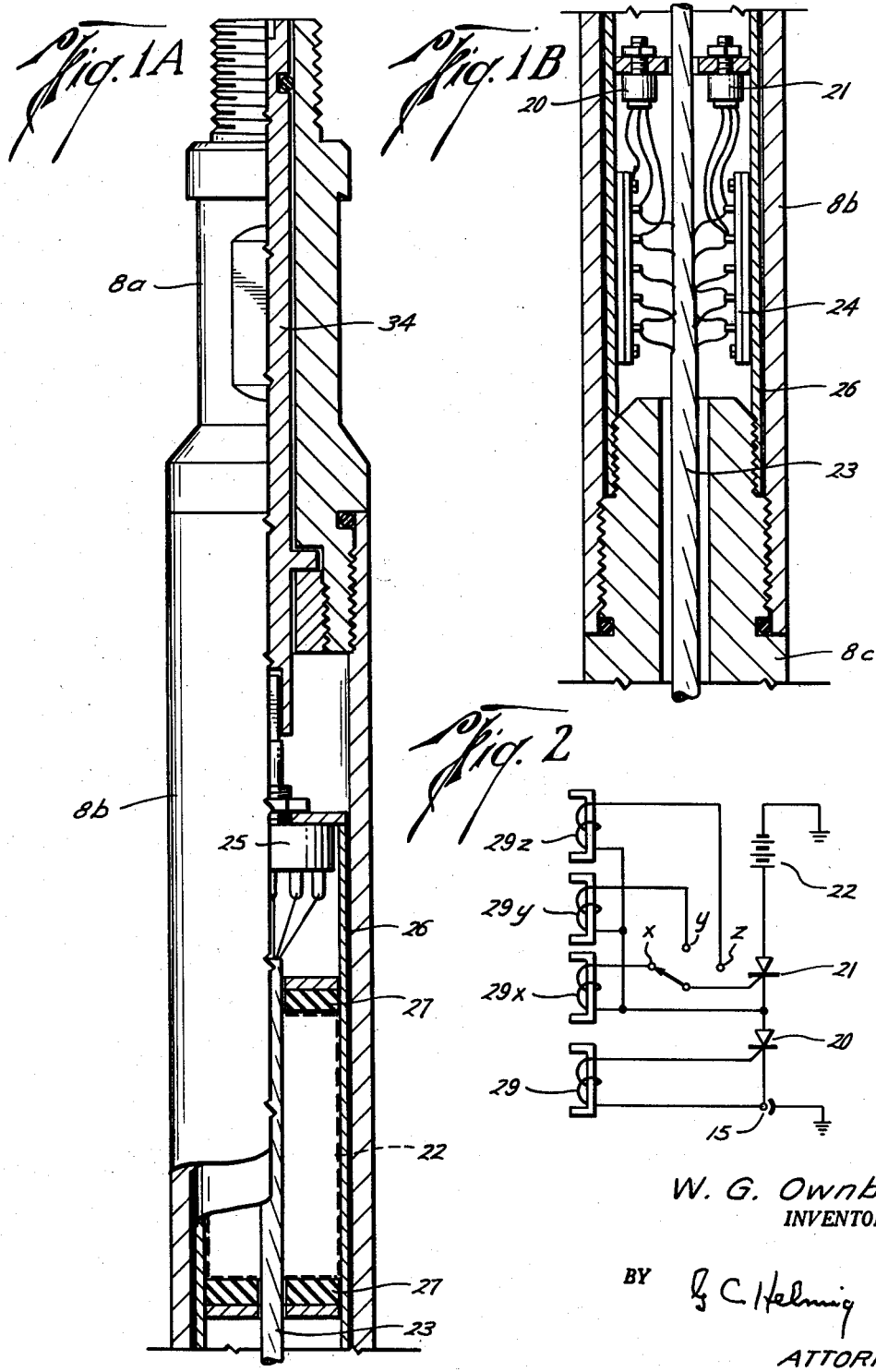
W. G. Ownby
INVENTOR.
BY
ATTORNEY

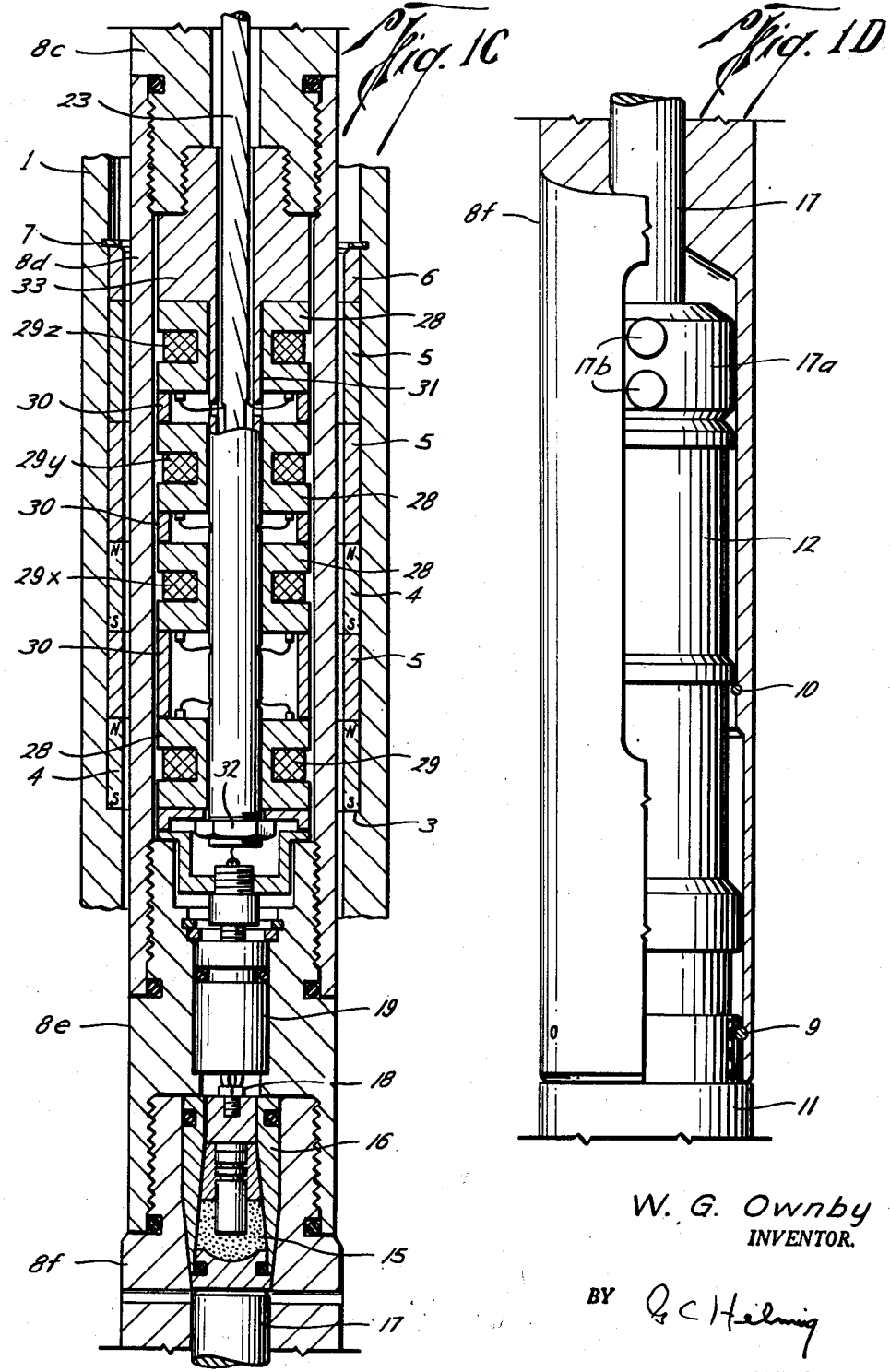

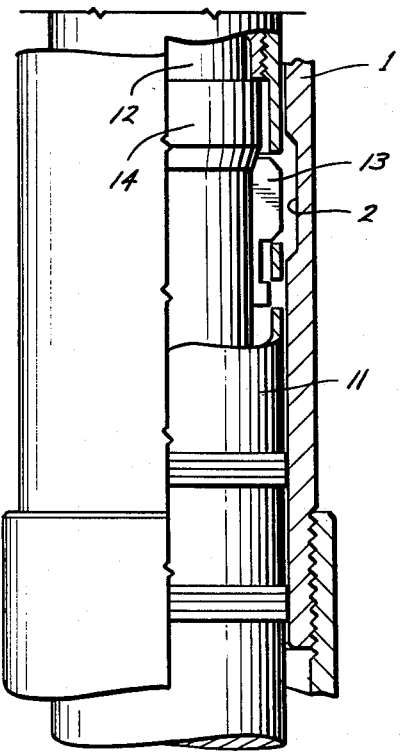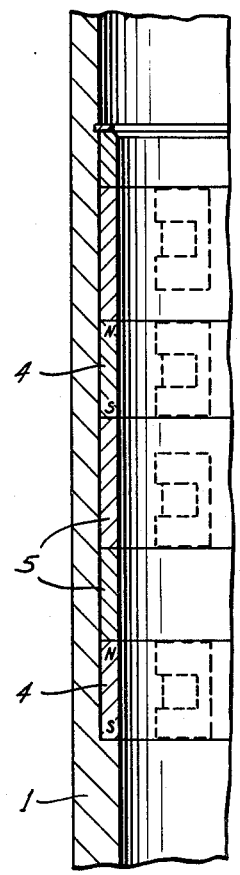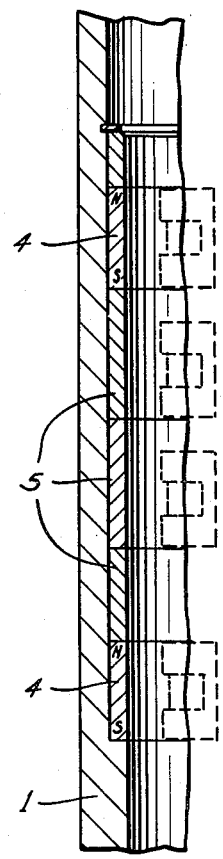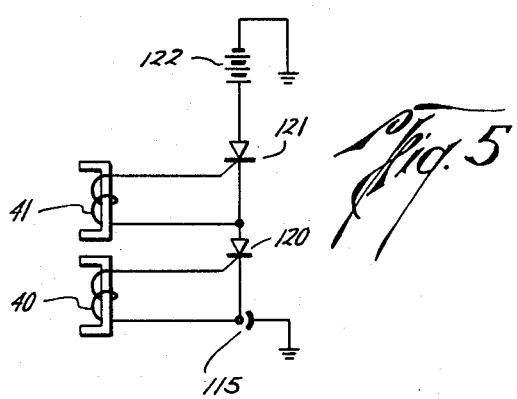
W. G. Ownby
INVENTOR.
ATTORNEY

March 2, 1965 W. G. OWNBY 3,171,486
MAGNETICALLY ACTUATED WELL TOOL AND COOPERATING TUBING NIPPLE
Filed April 19, 1961
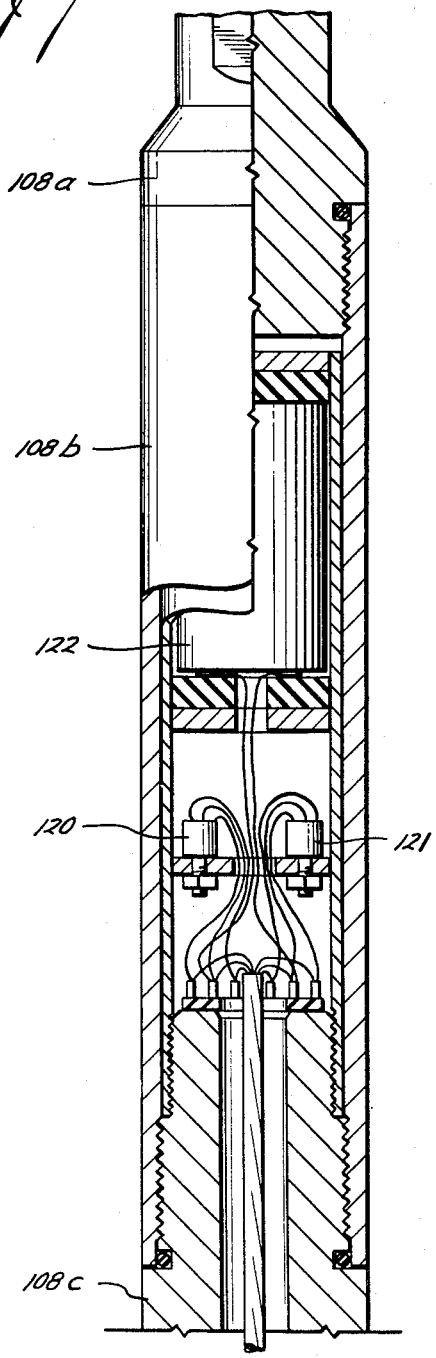
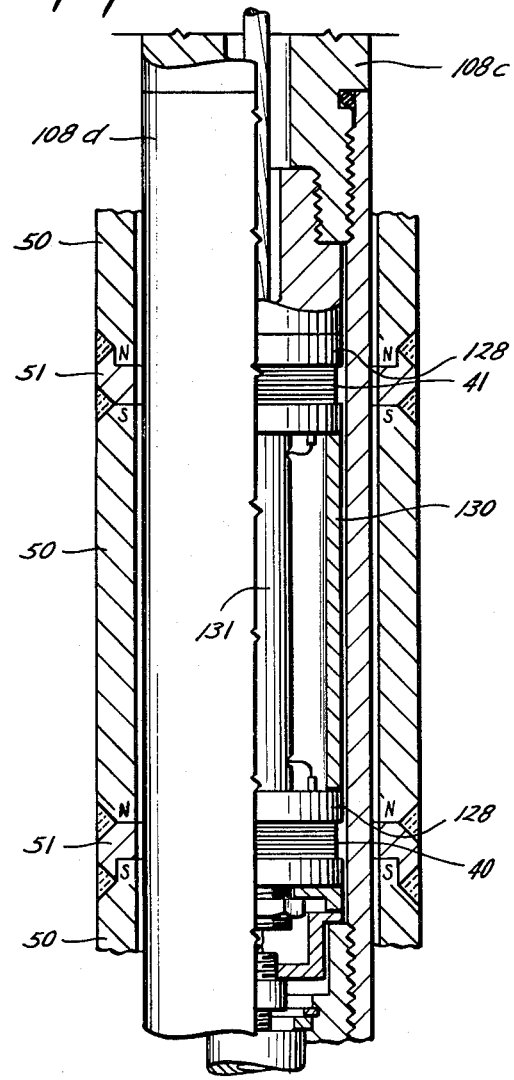
W. G. Ownby
INVENTOR.
BY
ATTORNEY

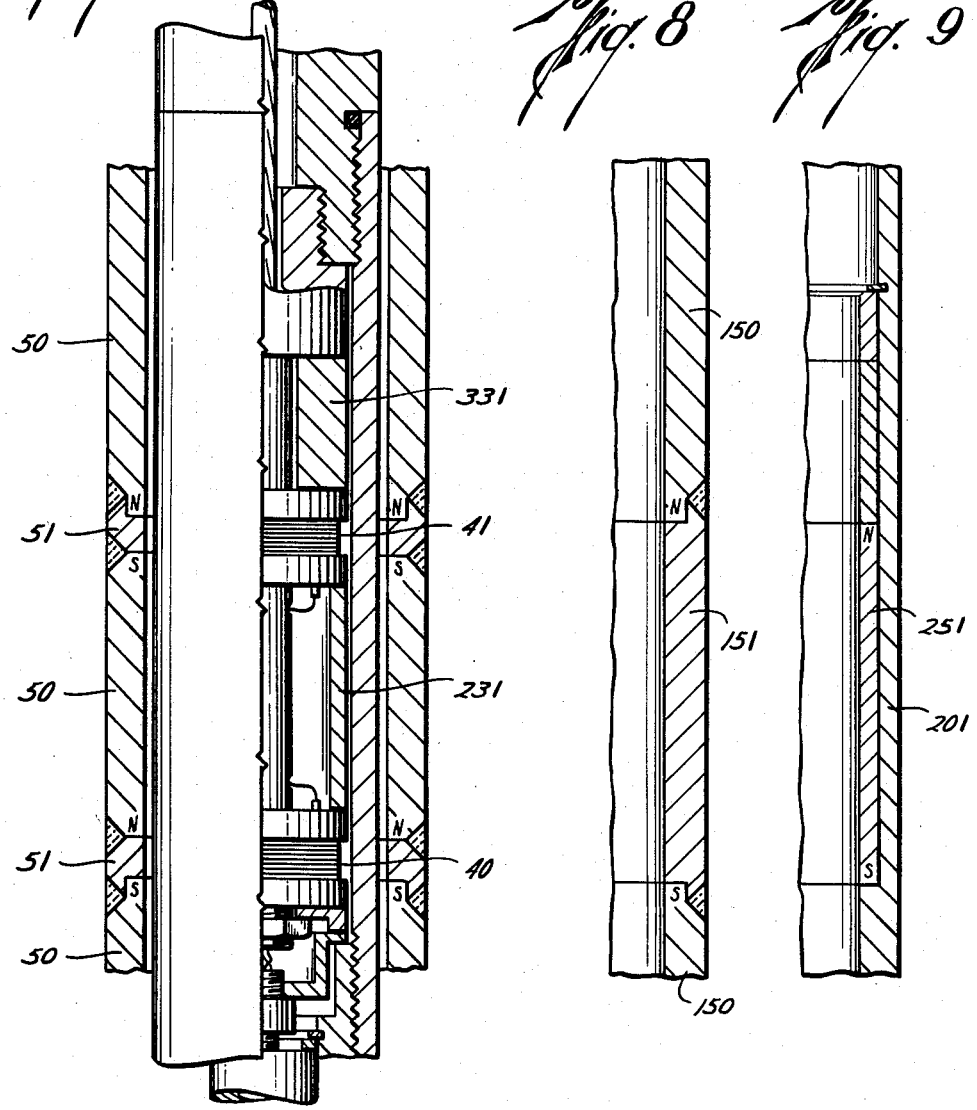

United States Patent Office 3,171,486
Patented Mar. 2, 1965

3,171,486
MAGNETICALLY ACTUATED WELL TOOL AND
COOPERATING TUBING NIPPLE
Warren G. Ownby, Houston, Tex., assignor to Camco, Incorporated, Houston, Tex., a corporation of Texas
Filed Apr. 19, 1961, Ser. No. 104,051
13 Claims. (Cl. 166—65)

This invention relates to well working equipment and more particularly to the signaling of work at a selected depth in a well hole.

In many instances, downhole well working tools are subjected to shock forces which may cause defective operation or misoperation of movable control parts to the harm of either or both the tool and its surroundings, or require costly fishing recoveries, and an object of the present invention is to minimize the likelihood of injury and operational mistiming by providing signal actuated and electrical control components in a self contained tool assembly of a safe and rugged construction wholly devoid of moving or delicate parts and for responsive action only when triggered by generation of an electromotive force upon tool travel through an external signaling field and the transmission of current for a working occurrence at a predetermined location in the line of piping.

Another object of the invention is to provide a tool for travel through a line of piping and having a self contained battery source of current for a work controlling circuit to be closed through a set of series connected solid state switches or semiconductor controlled rectifiers only upon concurrent delivery thereto of electromotive force induced by simultaneous magnetic field influence on passive transducers in the form of tool carried coils of conductive wire connected one to each semiconductor.

A further object is to provide a tubing string having a number of spaced apart signaling stations, each comprising a pair of magnetic fields differently spaced apart dimensionally relative to one another and a running tool having a number of spaced apart transducers which can be compounded selectively in cooperating pairs differently spaced apart and matched to the spacing of the respective pairs of tubing carried fields and which transducers in any combined pair are connected, one to one of a pair of circuit controlling semiconductors and the other to the other semiconductor.

Another object is to provide a running tool having a pair of spaced transducers which can be set to different relative spaced apart variations for matching a given spaced apart relation of magnetic fields of a tubing string.

A still further object is to provide a running tool having a field influenced coil arranged to impose positive polarity electromotive force on a circuit controlling semiconductor upon relative field and coil travel in one direction only whereby a tool can be constructed to be inoperative on descent through identical fields in a tubing string and on reaching a predetermined depth below any selected field, can be actuated by reverse or upward travel through the signaling field station next above the point of travel reversal.

Additional objects and advantages will become apparent from the accompanying drawings wherein FIGS. 1A, 1B, 1C, 1D and 1E are companion views showing continuing fragments of a running tool partly in elevation and partly in vertical section; FIG. 2 is a wiring diagram of the components in FIGS. 1A–1E; FIGS. 3 and 4 are vertical sections of fragments of the tubing sections at different signaling stations; FIG. 5 is a wiring diagram for the circuitry of a modified running tool; FIGS. 6A and 6B show in part elevation and part vertical section fragments of a modified running tool; FIG. 7 is a view similar to 6B, illustrating an alternate fixed spacing of a pair of transducers and cooperating tubing string provided magnetic fields and FIGS. 8 and 9 are vertical sectional views of tubing string sections respectively illustrative of other embodiments of a magnetic field providing signaling station.

Referring to FIGS. 1A–4, there is illustrated a wire line runing tool containing all operated components for electrically controlling the setting of a latch unit which may be considered in the nature of a hanger or well tool positioning device and the running tool is for setting the latch unit in any one of a number of receivers in a tubing string and for effecting latch actuation in response to moving traverse of a set of spaced apart transducers through a pair of magnetic fields positioned by the tubing string adjacent the predetermined receiver and in a spaced apart relation different from the fields at other receivers and to which distinctive spaced relation the transducer spacing has been coded or matched by a preset selective combination of a particular pair of running tool carried transducers.

Various types of working operations can be performed and the herein reference to the setting of a particular latch unit and its tubing receiver is but one example of a running tool usage. In this embodiment the tubing string is made up by incorporating at each of a number of spaced apart, predetermined and recorded intervals a special nipple or tubing section 1 having a full open bore devoid of landing shoulders or other internal obstruction to free passage through the nipple of the running tool or other well working equipments. As seen in FIG. 1–E, the nipple 1 has an internal annular groove or latch dog receiving keeper 2 and as seen in FIG. 1C, this nipple has formed in it at a given distance above the keeper groove 2, a bottom shoulder 3 of a larger diameter pocket or counterbore in the upper portion of the nipple.

At least in the region surrounding the counterbored pocket, the wall of the nipple is of brass or other suitable nonmagnetic material and has fitted within it an end to end succession or stack of rings seated downwardly on the shoulder 3 and preferably of the same internal diameter as the main bore of the nipple. Included in the stack are a set of two permanent magnet rings 4 and three nonmagnetic spacer rings 5 together with a top nonmagnetic ring 6 for retentive bearing cooperation with a spring expander ring 7 for a removable snap fit into a cooperating groove in the nipple wall. Rings of the same or of different lengths can be employed but in any event the magnet rings and the spacer rings 4 and 5 respectively are interchangeable as to their successive relationship for obtaining diverse spacing between the upper and lower magnet rings, as will be appreciated by a comparison of FIGS. 1C, 3 and 4. While the number of different magnet space relations can be varied and a greater number of spacer rings can be employed, it is to be expected that a well tubing string will ordinarily require latch receivers at no more than three locations and the variance in magnet spacing as illustrated will afford distinctive signals at three stations. In each instance, the lower magnet ring is retained at the bottom of the stack for simplifying the arrangement of magnet influenced elements of the running tool.

For cooperatively influencing the running tool transducers, as will later be more apparent, each magnet ring 4 is magnetized longitudinally and has its opposite poles at the top and bottom edges of the ring. With the north pole at the annular upper end, the field within and throughout the ring circle will protrude radially inwardly of the tubing string and the lines of force will run in a general longitudinal direction from the upper north pole to the bottom south pole. When any such field is traversed by a transducer, an output electromotive force will be induced but only when the spacing of a pair of transducers is coded or matched with the spacing of a particular pair of fields will both transducers be influenced simultaneously for signaling the performance of a desired operation.

For response selectively to any one and not to others of the several tubing string stations, an improved running tool is here proposed. As in FIGS. 1A–1E, the running tool includes a number of interconnected and related subassemblies within a main body or tubular housing which, for convenience of manufacture and use, is an end to end succession of hollow sections detachably screw threadedly coupled together. Thus from the top down, there is a wire line connector head 8a, an upper housing tube 8b, a coupler nipple 8c, an intermediate housing tube 8d, a coupler nipple 8e and a bottom latch unit receiving skirt 8f. The intermediate housing section 8d is of nonmagnetic material. The remaining housing sections are of suitable ferrous metal material.

In preparation for a running operation, the bottom skirt 8f is sleeved over and releasably secured by frangible or shear pins 9 and 10 to the upper ends of a tubular body 11 and an inner dog latch expander plunger 12 slidably nested within the body 11 for controlling the position of one or more latching dogs 13 which are laterally shiftably mounted in side windows through the wall of the latch unit body 11. As shown in FIG. 1E, the latching dog 13 is radially aligned with a tubing nipple keeper groove 2 but is inwardly retracted immediately below a downwardly tapered camming shoulder and enlarged annular band 14 formed on the latch expander plunger 12. Should such aligned relationship of latching dog and keeper occur at the instant that application of work force is signaled, the plunger will be driven down after first shearing the pin 10, which is relatively lighter than the shear pin 9, and then pushing the expander band 14 behind and projecting and holding the latch dog 13 within the keeper groove. With the latch body 11 securely anchored, an upper reaction force on the running tool or an upward jar, if needed, will break the pin connection 9 and free the running tool for withdrawal from the latched-in hanger unit.

Latch setting force is supplied by release of energy from an electrically fired squib providing an explosive or combustible charge 15 housed within a cartridge shell 16 which is mounted within an open-ended pocket at the top of the skirt 8f. When fired, the expanding gas acts downwardly on the top face of a slider stem 17 which terminates in a latch plunger engageable head 17a. The head 17a, slidably fitting within the skirt 8f, has radially outwardly projected retainer lugs 17b running within an axially elongated slot or window in the skirt 8f for guiding and defining the range of relative slide travel. The electrically actuated detonator for the squib is in a control or firing circuit, one side of which is grounded through the cartridge and running tool body and the other side of which includes a connector plug 18 projecting upwardly from and as a part of the cartridge 16 and on the longitudinal center line of the tool assembly. The longitudinal center line also is the axis of the screw threaded connection between the skirt 8f and coupler 8e. The connector plug 18 can rotate relative to its socket connector 19 mounted in the coupler 8e for accommodating detachment and attachment of the threaded together parts as required for ejection and replacement of a spent cartridge.

A current conductor wire leads upwardly from the socket connector 19 and is a part of the normally opened firing circuit, which is to be completed through a set of two semiconductor rectifier switches 20 and 21 in circuit series connection with one another and joined with a battery source of current 22. The semiconductor devices 20 and 21 are of the type commonly known as controlled rectifiers. A silicon controlled rectifier is a solid state semiconductor unit composed of layers of alternate conductivity type semiconductor material. Conveniently, the conductor wires between the several electrical components are grouped as a bundle 23 and various circuit connections are made at a connector panel or panels 24. The connector panel 24, the semiconductors 20 and 21, the battery 22 and a selector switch 25 constitute a subassembly package housed within an elongated inner cup or tube 26 which is protectively encased by the outer body section 8b and its lower end screw threadedly connected with the coupler 8c. Transverse walls within the inner tube 26 support the circuit components and preferably elastic washers 27 of resilient plastic or the like engage opposite ends of the battery 22 to cushion shock.

Housed within the lower nonmagnetic housing section 8d is a stack of passive transducers or motional electromotive force detectors secured together as a subassembly which, when the running tool is employed for setting a latch unit, is spaced from the position of the latch dog 13 a longitudinal distance substantially corresponding to the spacing between the nipple carried stack of rings 4 and 5 and the keeper groove 2. The detectors of the group are in a predetermined longitudinally spaced apart relation whereby any two detectors can be aligned radially with the circular magnets in one of the optional space settings of the magnet rings as previously mentioned and illustrated in FIGS. 1C, 3 and 4. For such cooperation, it is proposed to employ a group of four detectors, each comprising a bobbin or spool 28 of high magnetic permeable material wound with many turns of insulated electrical conducting wire. Four windings provide the coils shown at 29, 29x, 29y and 29z and they constitute transducers when presented to and moved longitudinally with the running tool through the logitudinal lines of force extending between the north and south poles of the magnet rings 4. Mention is here made that a motional electromotive force transducer output is directly proportional to the number of coil turns, its motional velocity and the strength of the magnetic field linking the coil turns, and that output polarity is determined by the polarity of the magnetic field and the motional direction of the transducer. These factors need to be taken into consideration as engineering expedients for obtaining the desired result.

The several spools 28, held apart by tubular spacers 30, are sleeved on a hollow spindle or stud 31. A washer and retainer nut 32 on the bottom of the central mounting stud 31 secures the spools upwardly against the stud head 33, which has a threaded pin end threaded into the coupler 8c. Extending through the hollow stud 31 is the wiring bundle 23 with leads passing through side openings for connection with the respective coils. In the present arrangement and as diagramed in FIG. 2, the wiring joins the lowermost coil 29 at all times with the semiconductor 20 for impressing thereon any current generated or induced at the coil 29. The remaining coils 29x, 29y and 29z are joined respectively with the fixed contacts x, y and z of the selector switch 25 and the output of any coil, as controlled by a presetting of the selector switch arm, is impressed on the semiconductor 21. Coils can be combined, two at a time, in physical spacing corresponding to a selected code or field spacing in the tubing string. Thus the selector switch position x codes the tool to the field spacing of FIG. 1C; position y codes the tool for response to the field setting of FIG. 3 and position z codes the tool for operative relation with the field spacing of FIG. 4. Such selection is made just prior to the coupling of the tool with a suspension wire line and by means of a screw driver or other manual tool engaged with the end of a switch shaft extension stud 34 rotatably mounted within the uppermost body section 8a and provided with a lower squared socket fitted to a squared terminal of the selector switch rotary shaft.

In the use of the running tool for setting a latch in a well, preadjustment of the selector switch codes a pair of transducers in relation to match with longitudinal spacing of the fields at a particular signaling station. As each coil of a selected pair passes through any field during tool descent, an electromotive force will be directed to the semiconductor coupled to that particular coil. Such bias voltage conditions the semiconductor for the passage of battery current but unless both semiconductors are conditioned to pass current at the same time, the battery or firing circuit remains closed. Simultaneous travel of both coils of a selected pair through the pair of fields at a tubing station to which the coils have been coded, delivers bias voltage to both series connected semiconductors for a switch-on of current for detonating or releasing the work performing energy provided by the squib assembly. The action is instantaneous for expanding the latch dogs 13 into anchored relation with the keeper groove 2.

Instead of a running tool which combines a large number of signal sensing coils and a switching arrangement for selectively combining the coils in various pairs, it will be feasible for some purposes to simplify running tool design by eliminating the selector switch and providing a tool with only two coils permanently connected to a pair of semiconductors. Such tool would then have circuitry as diagramed in FIG. 5 wherein a pair of semiconductors 120 and 121 are connected in series in the circuit between the battery 122 and the squib 115. Bias current is to be supplied to the semiconductor 120 from a coil 40 and bias current is received by the semiconductor 121 from a coil 41 and which coils are spaced apart a fixed distance in the tool for cooperative alignment with only the field magnets at a station in which the spacing of the magnets corresponds to that of the coils 40 and 41. Concurrent generation of electromotive force at both coils is needed to close the battery or work performing circuit as previously described.

The detail structure of the simplified tool embodiment is shown in FIGS. 6A and 6B. Here the semiconductors 120 and 121 and the battery 122 are housed within a tool body section 108b having top and bottom coupling sections 108a and 108c. Within the nonmagnetic section 108d of the running tool is contained the field sensing subassembly including the two coils 40 and 41 and their mounting spools 128 held on the mounting spindle 131 in fixed longitudinal distance apart by the spacer tube 130. The spacer tube 130 is of a length to position the detectors at maximum spaced apart relation on the mounting spindle 131. By substituting spacer tubes of other lengths, the distance between the coils can be selectively varied. Thus the running tool structure just described is also shown in FIG. 7 except that spacer tubes 231 and 331 have been substituted for decreasing the longitudinal dimension between the pair of cooperating coils.

The fixed spacing of the coils 40 and 41 in the running tool of FIG. 6B will respond to the field spacing of a tubing station arranged as in FIG. 4 while the alternate spacing of the coils as shown in FIG. 7 will code the tool to the field spacing illustrated in FIG. 3.

In certain regions of the earth, it will be practical to rely on terrestial magnetism instead of the permanent magnets previously described and advantage can be taken of the situation by constructing tubing string as shown in FIGS. 6B and 7. The tubing string will have its walls constructed of magnetic material except for short length circular inserts for providing a signaling station. Thus in FIGS. 6B and 7, tubing portions of magnetic material are indicated at 50—50 and short length nonmagnetic ring inserts are shown at 51—51. The nonmagnetic rings 51 in FIG. 6B are spaced apart similar to and in length generally correspond with the coil spools 128. The spacing can be varied as required, as indicated comparatively by FIGS. 6B and 7. In each instance, the earth's magnetism will afford magnetic poles of opposite polarity immediately above and below the ends of the nonmagnetic rings where they are welded or otherwise connected to the magnetic tubing sections. In the Northern Hemisphere, a north magnetic pole will be above and a south magnetic pole below each nonmagnetic insert and therefore the lines of force will flow longitudinally within the field between the poles. The lines of force will be upwardly in the Southern Hemisphere. In either event, the coil windings will be determined for imposing electromotive force of proper polarity on the semiconductor with reference to the direction of relative movement between the coil and the field and direction of lines of force in the field.

In view of what has just been said, the running tool, with only a pair of coils and in a fixed spaced apart relation, can be arranged for cooperation with a signaling station or for cooperation with any one of a number of stations whose signals are identical. Such identical stations, for example, could be arranged as shown in either FIG. 8 or FIG. 9. In FIG. 8, a single insert ring 151 of nonmagnetic material is welded in end to end succession with tubing string sections 150 of magnetic material so that the earth's magnetism provides a north pole above and a south pole below the nonmagnetic insert for the Northern Hemisphere. The axial length of the insert 151 is such that the lines of force in the field between the north and south poles can be simultaneously swept by both of a pair of sensing coils spaced, for example, as seen in FIG. 7.

For cooperation with any one of identical single field markings at several stations in the same tubing string, the running tool coil windings and connections should be such that positive polarity voltage on the semiconductors will be generated by coil travel upwardly through the magnetic fields. Thus running tool response is not triggered by tool descent and for selective actuation, the tool will be run downwardly to the predetermined depth below the station at which the work is to be performed. Upon reverse movement, the firing circuit will be closed at the instant tool movement carries the set of spaced transducers through the extended magnetic field above the point at which the direction of travel was reversed.

The same result can be effected by the use of a permanent magnet in the form of an axially elongated ring 251 magnetized in the direction of its length and positioned in a counterbored pocket at the upper end of a special nipple 201 of a well tubing string, as in FIG. 9. The longitudinal distance between north and south poles is sufficient that the extended field spans and influences both transducers in their concurrent motion through the field.

The running tools as here described are characterized especially by the absence of moving parts in the detectors of the signaling fields and the circuit controlling switches, which are responsive to the receipt of signals. Accidental closing of the firing circuit and shock breakage are practically eliminated. Further to increase ruggedness of assembly, an elastic foam or other solid filling may be introduced into the lower region of the running tool and around all of the components below the current supplying battery. This will minimize the effects of vibration and maintain electrical connections between the parts and also enable replacement of worn-out batteries from time to time.

Modifications in the structure as specifically described can be made without departing from the invention as set out in the appended claims.

What is claimed is:

1. In combination, a line of tubing, magnetic field means carried by the tubing at a given location and arranged for field protuberance inwardly of the tubing and a running tool to be passaged through the tubing and comprising an electric current responsive work performing device, a source of current therefor, semiconductor rectifier means having circuit connection with and controlling current flow between said source and said work performing device and motional electromotive force transducer means connected with said semiconductor rectifier means to render the same active for current flow upon traverse of the magnetic field means by the said motional electromotive force transducer means.

2. In combination, a string of tubing, a set of permanent magnets carried by and spaced apart longitudinally of the tubing and each having its opposite poles spaced apart longitudinally of the tubing and arranged for the projection of a magnetic field interiorly of the tubing and a running tool to be passaged through the tubing and comprised of an electrically actuated work performing device, a source of current therefor, a series of semiconductors connected in serial relation with one another and in circuit with said current source and said work performing device and corresponding in number with the number of permanent magnets in said set, a group of motional electromotive force transducers, one for each semiconductor, and joined thereto for supplying bias current and means mounting said transducers in longitudinally spaced apart relation in correspondence with the longitudinal spacing of said magnets.

3. In combination, a tubing string having a series of spaced apart signaling stations each providing a set of inwardly protruding fields of magnetic force which are spaced apart a distance differing from the field spacing in other of said stations and work performing mechanism to be run in the tubing string and to be electrically actuated upon traverse of a given station including a current supply circuit, a set of semiconductor rectifiers connected in series relation in said circuit to pass current upon concurrent receipt of electromotive force by said semiconductor rectifiers, a set of transducers for matching spaced apart conformity for spacing of any given set of fields and for connection with said semiconductor rectifiers to impress thereon the electromotive force induced as an incidence to travel simultaneously of the transducers through a given set of fields.

4. In combination, a tubing having a number of signal stations, each providing a pair of longitudinally spaced apart magnetic fields whose spacing differs dimensionally from the others, and a running tool for travel through the tubing and for signaled response upon traverse of a given station and comprised of a tool body containing a work controlling circuit, a pair of semiconductor rectifiers serially connected in the circuit, a first transducer having an output connection with one of the semiconductor rectifiers, a second transducer having an output connection with the other semiconductor rectifier, means positioning the transducers in the body to be influenced by magnetic field traverse and in a given spaced apart relation matching the dimensional spacing of the fields in one station for circuit closure upon concurrent output from both transducers solely in their traverse of said one station.

5. In the combination of claim 4 wherein the positioning means include interchangeable spacers to be interposed selectively between the transducers to establish their given spaced apart relation.

6. In combination, a tubing having a number of longitudinally spaced apart magnetic field producing components, each presenting north and south poles spaced apart a given longitudinal dimension and arranged for the field to extend in the same longitudinal direction at each such component, and a running tool for travel in the tubing and for traverse of the fields between said poles, comprising a tool body containing a work controlling circuit, a pair of semiconductors connected in the circuit in series relation and responsive to the application thereon of electromotive force to effect a switch-on condition and a pair of transducers, one connected to one semiconductor and the other connected to the other semiconductor and spaced apart in the tool body a longitudinal distance to present both thereof simultaneously within the field between the north and south poles of any component traversed by the transducers, each transducer comprising a coil whose winding in relation to the direction of said magnetic fields provides positive polarity output upon field traverse in one direction only of tool travel.

7. In combination, a well tubing string having a series of spaced apart and inwardly protruding magnetic fields extending between longitudinally spaced apart poles and a running tool for travel downwardly and upwardly through the tubing string, a work control electric circuit therefor containing a pair of semiconductor rectifiers in series for closing the circuit upon concurrent delivery to both semiconductor rectifiers of electromotive force of given polarity and coils of wound wire connected to the semiconductor rectifiers respectively and mounted by the tool body in a spaced relation to be concurrently influenced by said fields upon traverse thereof, said coils in relation to the polarity of said fields being wound in directions to deliver current of said given polarity only on field traverse in upward tool travel direction.

8. In a running tool adapted to be triggered into action by electromotive force induced by relative travel between the tool and a magnetic field signaling means and comprised of an electrically actuated work performing device, a current supply circuit therefor, a pair of semiconductor recifiers connected in series in the circuit, a first field influenced coil connected with one of the semiconductor rectifiers and a second field influenced coil connected with the other semicondctor rectifier and means presenting the coils in given spaced apart relation as dictated by the character of the field signaling means to which a circuit closing response is desired.

9. In a running tool of the character described, a work performing electric circuit, a pair of semiconductors arranged in series in the circuit, a stack of passive transducers adapted for conjoint use in selected pairs and selector means operable to combine the transducers of the stack in selected paired combinations and to connect one transducer of the selected pair to one of said semiconductors and the other transducer of the selected pair to the other of said semiconductors.

10. In a running tool to be signaled into operation upon traverse of magnetic field means within a tubing string, a tool body containing a work controlling electric circuit, a semiconductor rectifier connected in said circuit, a transducer connected to impose electromotive force on said semiconductor rectifier and means mounting said transducer in the tool body for exposure to the influence of a tubing string magnetic field traversed by the transducer.

11. In a running tool to be signaled into operation upon traverse of magnetic field means within a tubing string, a tool body containing a work controlling electric circuit, a pair of semiconductor rectifiers connected in series relation in said circuit, a first transducer having an output connection with one of the semiconductor rectifiers, a second transducer having an output connection with the other semiconductor rectifier and means mounting said transducers in spaced apart relation in the tool body and in positions to be concurrently within the influence of tubing string magnetic field means upon traverse thereof.

12. A running tool as described in claim 11, wherein the transducer mounting means includes means to vary selectively the spaced apart relation of the transducers and to code the same for concurrent response solely to a given magnetic field arrangement matched to selected spacing of the transducers.

13. In a running tool adapted to be triggered into action by electromotive force induced by relative travel between the tool and a magnetic field signaling means and comprised of an electrically actuated work performing device, a current supply circuit therefor, a pair of series connected circuit control elements normally in circuit opening relation and active to complete the circuit in response to concurrent application of electromotive force on both elements, a first motional electromotive force transducer connected to one of said elements and a second motional electromotive force transducer connected to the other element.

(References on following page)

References Cited in the file of this patent

UNITED STATES PATENTS

| | | |
|---|---|---|
| 1,804,078 | Baden | May 5, 1931 |
| 2,147,544 | Potts | Feb. 14, 1939 |
| 2,327,658 | Miller | Aug. 24, 1943 |
| 2,419,468 | Smith | Apr. 22, 1947 |
| 2,544,979 | Brokaw et al. | Mar. 13, 1951 |
| 2,711,879 | Ring | June 28, 1955 |
| 2,712,854 | Creighton | July 12, 1955 |
| 2,809,699 | Battle | Oct. 15, 1957 |
| 2,844,357 | Ring | July 22, 1958 |
| 2,900,028 | Hanes | Aug. 18, 1959 |

FOREIGN PATENTS

| | | |
|---|---|---|
| 1,236,712 | France | June 13, 1960 |